(12) United States Patent
Bech

(10) Patent No.: US 8,147,202 B2
(45) Date of Patent: Apr. 3, 2012

(54) WIND TURBINE, A HUB FOR A WIND TURBINE AND USE HEREOF

(75) Inventor: Anton Bech, Ringkøbing (DK)

(73) Assignee: Vestas Wind Systems A/S, Aarhus N (DK)

( * ) Notice: Subject to any disclaimer, the term of this patent is extended or adjusted under 35 U.S.C. 154(b) by 1044 days.

(21) Appl. No.: 11/995,051

(22) PCT Filed: Jul. 8, 2005

(86) PCT No.: PCT/DK2005/000487
§ 371 (c)(1),
(2), (4) Date: Mar. 25, 2008

(87) PCT Pub. No.: WO2007/006301
PCT Pub. Date: Jan. 18, 2007

(65) Prior Publication Data
US 2008/0199315 A1 Aug. 21, 2008

(51) Int. Cl.
*B64C 11/06* (2006.01)
(52) U.S. Cl. .................................................. 416/204 R
(58) Field of Classification Search .............. 416/204 R, 416/205, 248
See application file for complete search history.

(56) References Cited

U.S. PATENT DOCUMENTS
2,488,825 A 11/1949 Palumbo
2003/0147751 A1* 8/2003 Wobben .................. 416/174

FOREIGN PATENT DOCUMENTS
| DE | 11 29 117 | 5/1962 |
| DE | 44 32 986 | 11/1995 |
| GB | 1 461 676 | 1/1977 |
| JP | 07 259721 | 10/1995 |
| JP | 07 310726 | 11/1995 |
| JP | 10 034556 | 2/1998 |
| WO | WO 01/69081 | 9/2001 |

OTHER PUBLICATIONS

International Search Report; PCT/DK2005/000487; Mar. 13, 2006.

* cited by examiner

*Primary Examiner* — Edward Look
*Assistant Examiner* — Adam Benson
(74) *Attorney, Agent, or Firm* — Wood, Herron & Evans, L.L.P.

(57) ABSTRACT

The invention relates to a wind turbine including at least two blade units. Each blade unit has a pitch controlled wind turbine blade and at least one pitch bearing including at least one outer ring, at least one center ring and at least one inner ring. The wind turbine further includes a hub comprising a mount area for each of the blade units (31). The mount area comprises at least two concentric load transferring surfaces for attaching the blade unit, via the at least one pitch bearing. The invention further relates a hub and a use hereof.

26 Claims, 8 Drawing Sheets

*A-A*

*B-B*

*C-C*

WIND TURBINE, A HUB FOR A WIND TURBINE AND USE HEREOF

TECHNICAL FIELD OF THE INVENTION

The invention relates to a wind turbine, a hub for a wind turbine and use hereof.

DESCRIPTION OF THE RELATED ART

A wind turbine known in the art comprises a wind turbine tower and a wind turbine nacelle positioned on top of the tower. A wind turbine rotor with three wind turbine blades is connected to the nacelle through a low speed shaft, as illustrated on FIG. 1.

Modern wind turbines control the load on the rotor by pitching the blades in and out of the incoming wind. The blades are pitched to optimize the output or to protect the wind turbine from damaging overloads.

To perform the pitch, each blade is provided with a pitching arrangement comprising a pitch bearing between the hub and the blade, and some sort of mechanism, most often a hydraulic cylinder, to provide the force for pitching the blade and maintaining it in a given position. This pitching arrangement enables each blade to be turned approximately 90° around their longitudinal axis.

As the size of the modern wind turbines increase, the load, on most of the different parts which a wind turbine consists of, also increase. Especially, the loads on the pitching arrangement are significantly increased due to increased blade size and overall power output of the wind turbine. Furthermore, the use of material in the pitching arrangement and thus the weight of the arrangement has increased significantly with the increasing size of the modern wind turbine.

PCT application no. WO-A 01/69081 discloses a pitch bearing for a wind turbine, wherein the wind turbine blade ends in a forked flange. The surfaces of the blade flanges are connected to the inner and outer ring of a three ring bearing. The blade design becomes more complex, in that the blade has to be split up in two sub-shells each comprising attachment flanges, which increases the costs and overall weight of the wind turbine blade significantly.

BRIEF SUMMARY OF THE INVENTION

The invention is to provides a wind turbine technique with an improved pitch joint, which is strong and weight efficient.

The invention provides for a wind turbine comprising at least two blade units each comprising a pitch controlled wind turbine blade, and at least one pitch bearing including at least one outer ring, at least one centre ring and at least one inner ring, and a hub comprising a mount area for each of the blade units, characterized in that the mount area comprises at least two concentric load transferring surfaces for attaching the blade unit, via the at least one pitch bearing.

Hereby, it is possible to ensure a simple blade attachments design with only one attachment flange on the blade, and by providing the mount areas on the hub with at least two concentric load transferring surfaces, it is possible to provide for a rigid design of the hub, which can provide for a strong and rigid connection between an outer and an inner ring of a three ring pitch bearing. This is also advantageous in that the weight of the material needed to make such a strong and rigid connection is moved closer to the centre of rotation, hereby reducing the loads on the hub.

Furthermore, the at least two concentric load transferring surfaces enable that the loads of and from the blade and the pitch bearing can be spread over a larger area enabling better load transferring qualities of the hub.

It should be emphasized that the term "hub" is to be understood as the part of the wind turbine to which the blades are attached. The term "hub" therefore also covers the teetering device to which the blades are attached on teeter wind turbines.

In an aspect of the invention, the at least one outer ring of the at least one pitch bearing is attached to one of the at least two load transferring surfaces, and the at least one inner ring of the at least one pitch bearing is attached to the other of the at least two load transferring surfaces.

By connecting one of the bearing rings to one of the load transferring surfaces and the other ring to the other load transferring surface, the load from the blade unit is transferred over a larger area of the mount areas on the hub. This is advantageous in that the loads and the tension in the hub can be better distributed and transferred to the nacelle.

In an aspect of the invention, the at least one centre ring is attached to a flange on the blade, e.g., a root flange, by blade attachment means such as screws, bolts or studs.

It is advantageous to connect the blade to the centre ring of the bearing, in that it provides for a simple and thereby both cost and weight efficient design of the blades.

In an aspect of the invention, the at least two concentric load transferring surfaces are separated by at least one groove.

Separating the load transferring surfaces by a groove is advantageous, in that it provides space for the centre ring to move a little without getting in contact with the surface connecting the two concentric load transferring surfaces, if the pitch bearing is of a type where the bottom and/or top surfaces are aligned.

In an aspect of the invention, the blade attachment means extends into the at least one groove.

The bearing ring which is connected to the blade, is usually connected by blade attachment means such as stud bolts. If the bearing rings where aligned or substantially aligned and there where no groove under the centre ring, the centre ring would have to be offset significantly in relation to the inner and outer bearing rings to provide room for the extending stud bolts. This would increase the weight and the cost of the bearings, in that parts of the inner and outer bearing rings only would function as spacers. It is therefore advantageous if the blade attachment means extends into the groove.

In an aspect of the invention, the groove is filled or partially filled with a lubricant such as bearing grease.

Providing the groove with a lubricant such as bearing grease is advantageous, in that it both lubricates the bearing and prevents dirt, water or other potentially harmful materials from getting in contact with the bearing.

In an aspect of the invention, the at least two mount areas each are provided with examining through holes at least for examining the blade attachment means.

It is advantageous to provide the mount areas with examining through holes, in that they enable the possibility of inspecting and tightening the blade attachment means after the rotor has been assembled.

In an aspect of the invention, the at least two mount areas each are provided with four or more mutually evenly spaced examining through holes.

The pitching arrangement enables each blade to be turned a little over 90°. It is therefore advantageous to provide the mount areas with four or more mutually evenly spaced examining through holes, in that all blade attachment means can be reached over a 90° pitch of the blades.

In an aspect of the invention, the examining through holes are positioned in or in close proximity to the at least one groove.

The groove is positioned under the blade attachment means and the examining through holes are provided to examine and possibly tighten the blade attachment means. It is therefore advantageous to place the examining through holes in or in close proximity of the groove.

In an aspect of the invention, the examining through holes are plugged, e.g., by means of plain or threaded plugs.

When the examining through holes are not in use it is advantageous to plug them to prevents dirt, water or other potentially harmful materials from getting in contact with the pitch bearing.

In an aspect of the invention, bottom sides opposite the load transferring surfaces and in close proximity of the examining through holes on the hub, comprise one or more contact surfaces for tightening equipment, e.g., for tightening the blade attachment means.

Large blade attachment means such as stud bolts are usually tightened by use of special tightening equipment, which pulls the bolt while tightening the nut. This tightening equipment requires a rigid surface to enable this axial pull of the bolt. It is therefore advantageous to provide the hub with a contact surface around the examining through holes on the side of the hub opposite the load transferring surfaces.

In an aspect of the invention, the mount areas comprise fault detection systems, establishing a closed electrical circuit at a mechanical defect of the blade attachment means.

It is very dangerous if the blade attachment means breaks or the nuts loosen themselves, in that it in worst case could lead to a blade falling of. It is therefore advantageous to provide the mount areas with a fault detection system, which can detect a mechanical defect if a closed electrical circuit is established.

In an aspect of the invention, the fault detection systems comprise at least one detection ring or detection ring parts which is electrically isolated from and have opposite electrical potential of the blade attachment means.

By providing the fault detection systems with a detection ring or detection ring parts and electrically isolating them from the blade attachment means, it is possible to detect if any defects occur, which will establish contact between the ring and the blade attachment means and thereby close an electrical circuit. It is therefore also advantageous to provide the blade attachment means and the detection ring or ring parts with opposite electrical potential.

In an aspect of the invention, the at least one detection ring or detection ring parts is positioned in the groove.

The blade attachment means are positioned in or over the groove and the detection ring or detection ring parts are provided for detecting defects of the blade attachment means. It is therefore advantageous to place the detection ring or detection ring parts in the groove.

The invention further provides for a wind turbine hub for a wind turbine, the hub comprising at least two mount areas for mounting wind turbine blades via pitch bearings including at least one outer ring, at least one centre ring and at least one inner ring, characterized in that the mount areas each comprise at least two concentric load transferring surfaces for attachment of at least two of the rings.

Hereby is achieved an advantageous embodiment of a hub according to the invention.

In an aspect of the invention, the load transferring surfaces each are provided with load transferring attachment means such as one or more circles of plain through holes, threaded through holes, threaded pins or preferably threaded blind holes.

It is advantageous to provide the load transferring surfaces with attachment means such as threaded blind holes, in that it enables the attachment of the pitch bearing in a simple and well-proven way.

In an aspect of the invention, the at least two concentric load transferring surfaces are separated by at least one groove.

Hereby is achieved an advantageous embodiment of the invention.

In an aspect of the invention, the at least one groove has a radial width of between 5 and 250 mm, preferably 15 and 150 mm and most preferred 30 and 100 mm.

The present width ranges of the groove provides for an advantageous relation between space for the extending blade attachment means and the width and rigidity of the adjacent load transferring surfaces.

In an aspect of the invention, the at least one groove has a depth in relation to the load transferring surfaces of between 5 and 250 mm, preferably 10 and 150 mm and most preferred 20 and 90 mm.

The present depth ranges of the groove provides for an advantageous relation between space for the extending blade attachment means and the rigidity of the load transferring surfaces.

In an aspect of the invention, the at least two mount areas are provided with examining through holes.

Hereby is achieved an advantageous embodiment of the invention.

In an aspect of the invention, the at least two mount areas each are provided with four or more mutually evenly spaced examining through holes.

Hereby is achieved an advantageous embodiment of the invention.

In an aspect of the invention, the examining through holes are positioned in or in close proximity to the at least one groove.

Hereby is achieved an advantageous embodiment of the invention.

In an aspect of the invention, the examining through holes have a diameter of between 5 and 250 mm, preferably 15 and 150 mm and most preferred 30 and 110 mm.

The present diameter ranges of the examining through holes provides for an advantageous relation between space for examining and possibly tightening of the blade attachment means and the rigidity of the mount areas on the hub.

In an aspect of the invention, bottom sides opposite the load transferring surfaces and in close proximity of said examining through holes on said hub, comprise one or more contact surfaces for tightening equipment.

Hereby is achieved an advantageous embodiment of the invention.

In an aspect of the invention, the one or more contact surfaces are parallel with the concentric load transferring surfaces.

To ensure that the tightening equipment functions properly and does not damage the blade attachment means when pulling them, it is advantageous that the contact surfaces are parallel with the load transferring surfaces.

The invention further provides for use of a wind turbine hub on a wind turbine, wherein the wind turbine is a variable speed pitch wind turbine.

The joint between the blades and the hub are usually under more strain on a variable speed pitch wind turbine, than on a fixed speed wind turbine, due to the variations in load produced by the varying speeds. It is therefore advantageous to provide a variable speed pitch wind turbine with a hub according to the invention.

BRIEF DESCRIPTION OF THE FIGURES

The invention will be described in the following with reference to the figures in which FIG. 1. illustrates a large modern wind turbine as seen from the front.

DETAILED DETAILED DESCRIPTION

Figure 1:
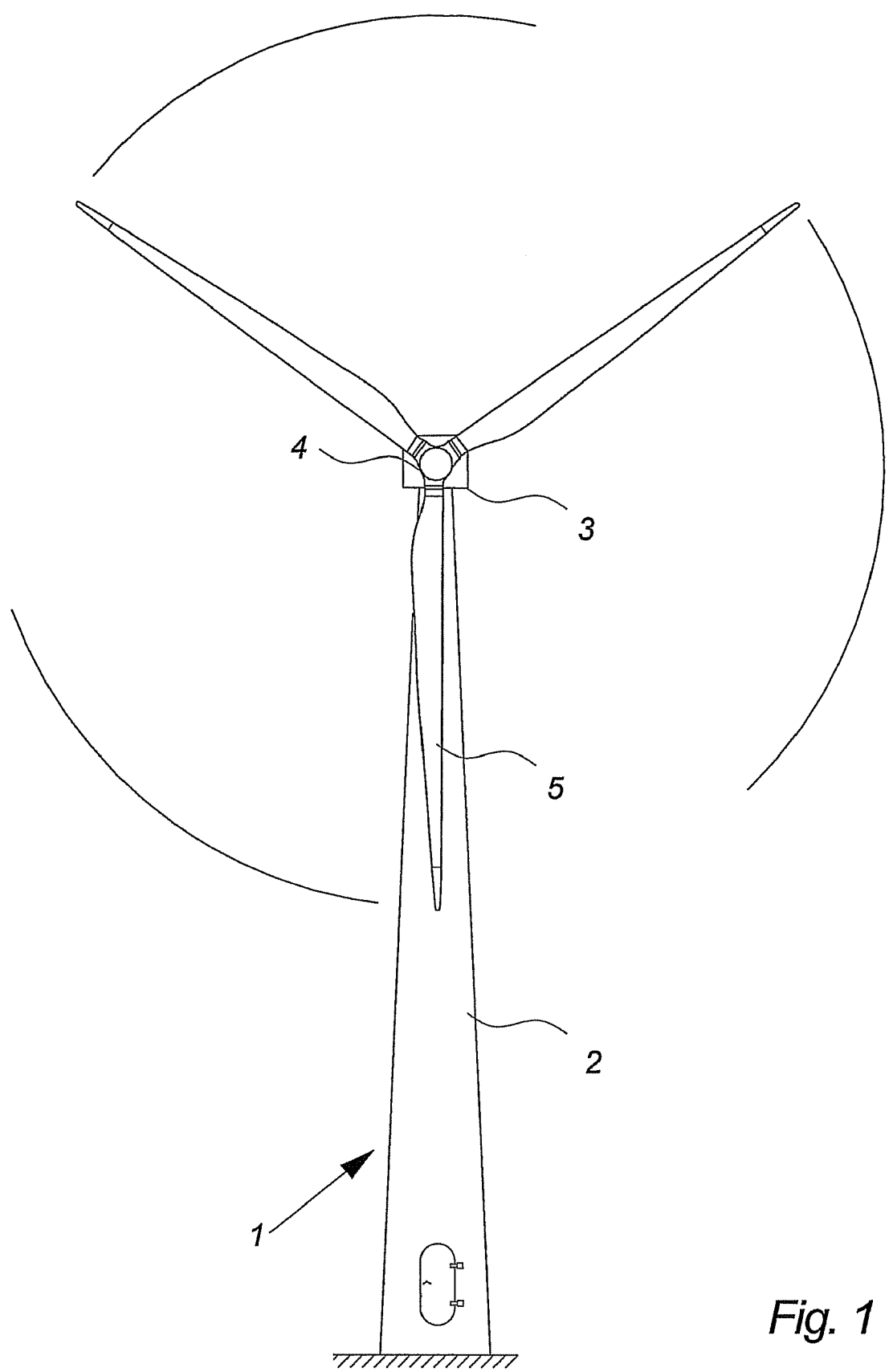

FIG. 1 illustrates a wind turbine 1, comprising a tower 2 and a wind turbine nacelle 3 positioned on top of the tower 2. The wind turbine rotor 4, comprising three wind turbine blades 5, is connected to the nacelle 3 through the low speed shaft which extends out of the nacelle 3 front.

Figure 2:
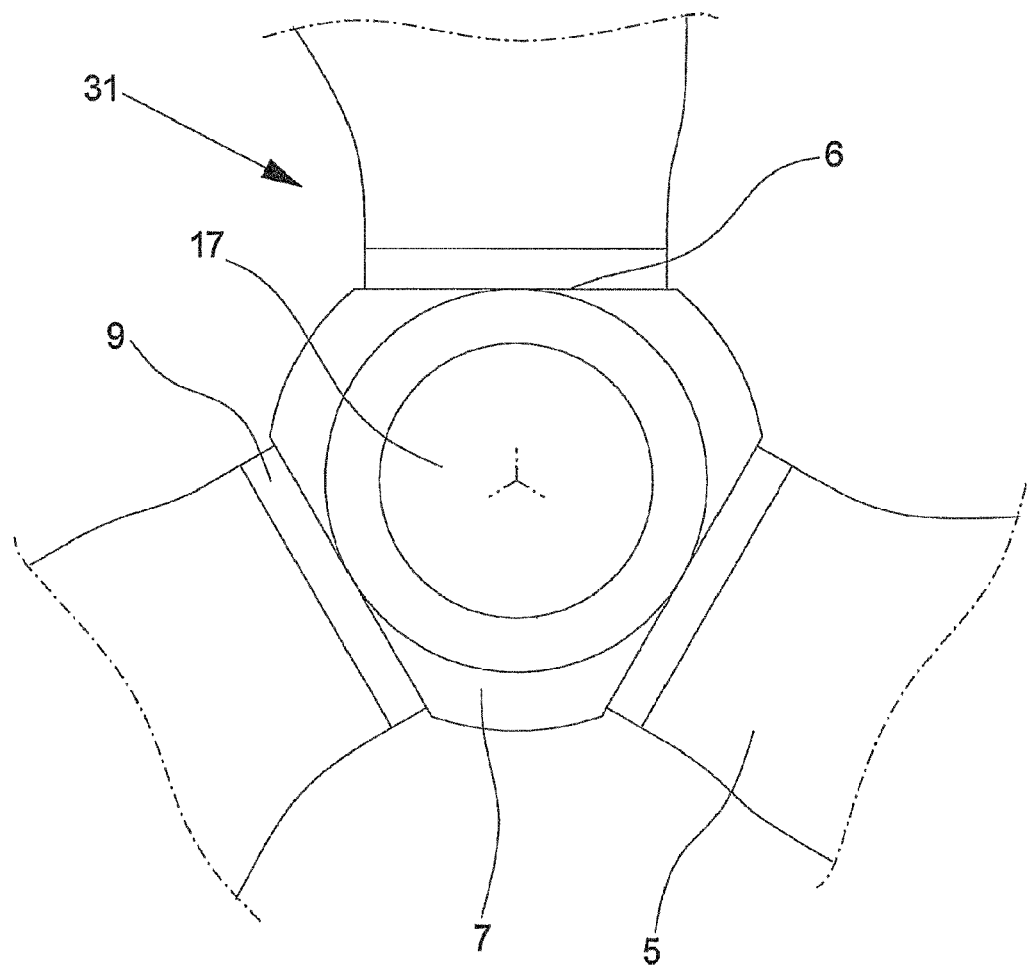
FIG. 2 illustrates a wind turbine hub comprising three blades as seen from the front.

FIG. 2 illustrates a wind turbine hub 7 comprising three blades 5 as seen from the front. In this embodiment of the invention, the hub 7 comprises three mount areas 6 for attachment of the blade units 31. Each blade unit 31 comprises a wind turbine blade 5 and a pitch bearing 9. The pitch bearing 9 is attached to the blade 5 and to the mount area of the hub 7 enabling the blade 5 to turn around its longitudinal axis.

In this embodiment of the invention the hub 7 further comprise an aperture 17 in the front part of the hub 7.

The pitch bearing 9 has to transfer forces mainly from three different sources. The blade 5 (and the bearings 9 themselves of course) is under constant influence of the force of gravitation. The direction of the gravitational force varies depending on the blades 5 position, inducing different loads on the pitch bearings 9. When the blade is in motion the bearing 9 is also under influence of a centrifugal force, which mainly produces an axial pull in the bearing 9. Finally, the bearings 9 are under influence of the wind load on the blades 5. This force is by far the greatest load on the bearings 9 and it produces a massive moment, which the bearings 9 have to stand.

The load on and from all the pitch bearings 9 has to be transferred to the hub 7 and further into the rest of the wind turbine 1. This fact makes the load transferring between the pitch bearings 9 and the hub 7 very crucial, especially when the loads get bigger due to bigger blades and bigger power output.

In this embodiment of the invention, the hub 7 is illustrated with three mount areas 6 and thereby three blades 5, but in another embodiment, the hub 7 could comprise two or four mount areas 6.

Figure 3:
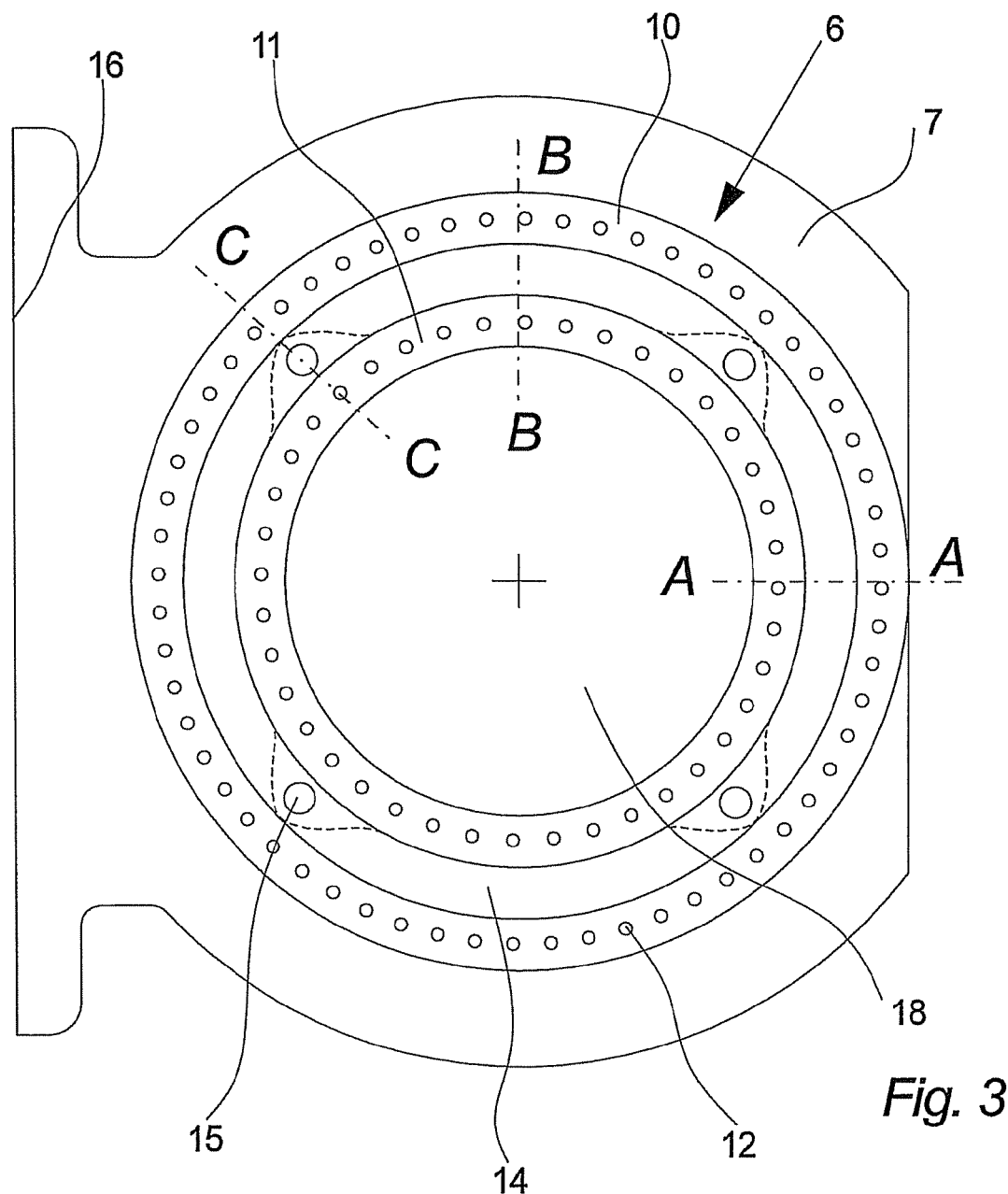
FIG. 3 illustrates a wind turbine hub without blades as seen perpendicular to a blade mount area.

FIG. 3 illustrates a wind turbine hub 7 without blades 5 as seen perpendicular to a blade mount area 6. In this embodiment of the invention, the hub 7 comprises a surface 16 for attaching the hub 7 to the low speed shaft or directly to the gear in or in close proximity of the nacelle 3.

Traditional wind turbine mount areas 6 comprise one load transferring surface, but in this embodiment of the invention, the mount area 6 comprise both an outer load transferring surface 10 and a concentrically placed inner load transferring surface 11, both centered around an aperture 18 in the mount area 6. Each load transferring surface 10, 11 comprise a number of internally threaded blind holes 12, but in another embodiment of the invention the load transferring surfaces 10, 11 could comprise through holes, externally threaded pins, a combination thereof or any other mean suitable for attaching pitch bearings 9 to load transferring surfaces 10, 11.

In this embodiment of the invention the two load transferring surface 10, 11 are separated by a groove 14 concentrically placed between the two load transferring surfaces 10, 11. The groove 14 is illustrated with a uniform width, but in another embodiment of the invention both the depth and the width of the groove could vary. The groove 14 is provided with four evenly spaced examining holes 15. Since the blades traditionally can pitch a little over 90°, all of the blade attachment means can be reached or examined through the four examining holes 15, but in another embodiment of the invention the mount area 6 could be provided with another number of examining holes 15 such as one, three, five or six. The examining holes 15 are placed in the middle of the groove 14, but in another embodiment of the invention the examining holes 15 could be placed on another pitch diameter or they could each be of a diameter bigger than the width of the groove 14, making them extend into the load transferring surfaces 10, 11.

Figure 4:
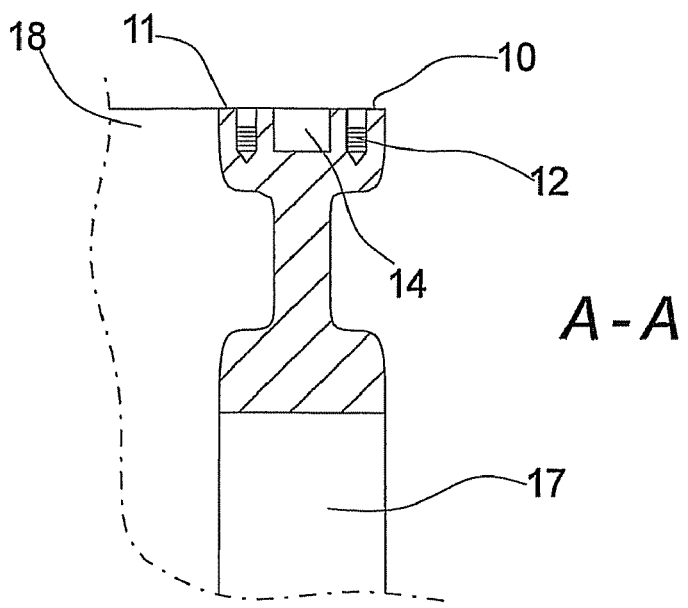
FIG. 4 illustrates section A-A, B-B and C-C of FIG. 3.
Figure 4:
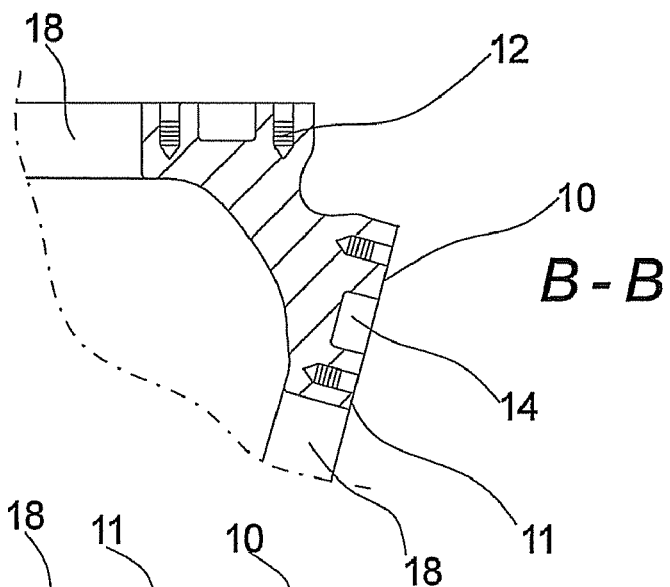
Figure 4:
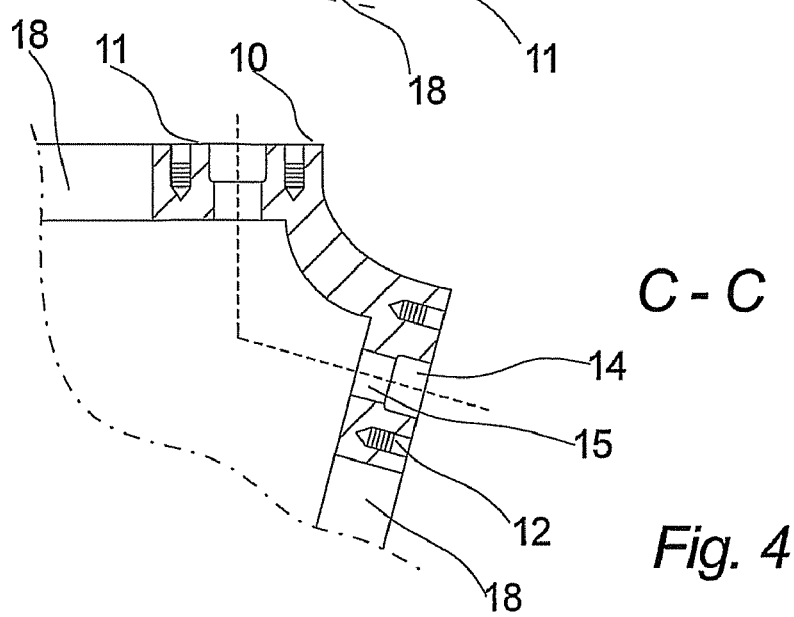

FIG. 4 illustrates three different sections of FIG. 3. Section A-A illustrates a section on the mount area 6 near the front of the hub 7. The two load transferring surfaces 10, 11 are separated by a groove 14 and the load transferring surfaces 10, 11 are provided with threaded blind holes 12 for attaching the rings of a pitch bearing 9. In this embodiment of the invention, the grooves are shaped as a rectangle with rounded corners, but in another embodiment of the invention, the groove could be, e.g., semicircular or polygonally shaped.

Section B-B illustrates a section of the mount area 6 near another mount area 6 and between two examining holes 15. The material between the two mount areas 6 is designed to make a strong and rigid connection between the two mount areas 6 and the rest of the hub 7.

Section C-C illustrates a section of the mount area 6 near another mount area 6 and through examining holes 15 in both mount areas 6. The hub is designed so that there is free access through both examining holes 15 while the connection between the two mount areas 6 and the rest of the hub 7 is still strong and rigid.

Figure 5:
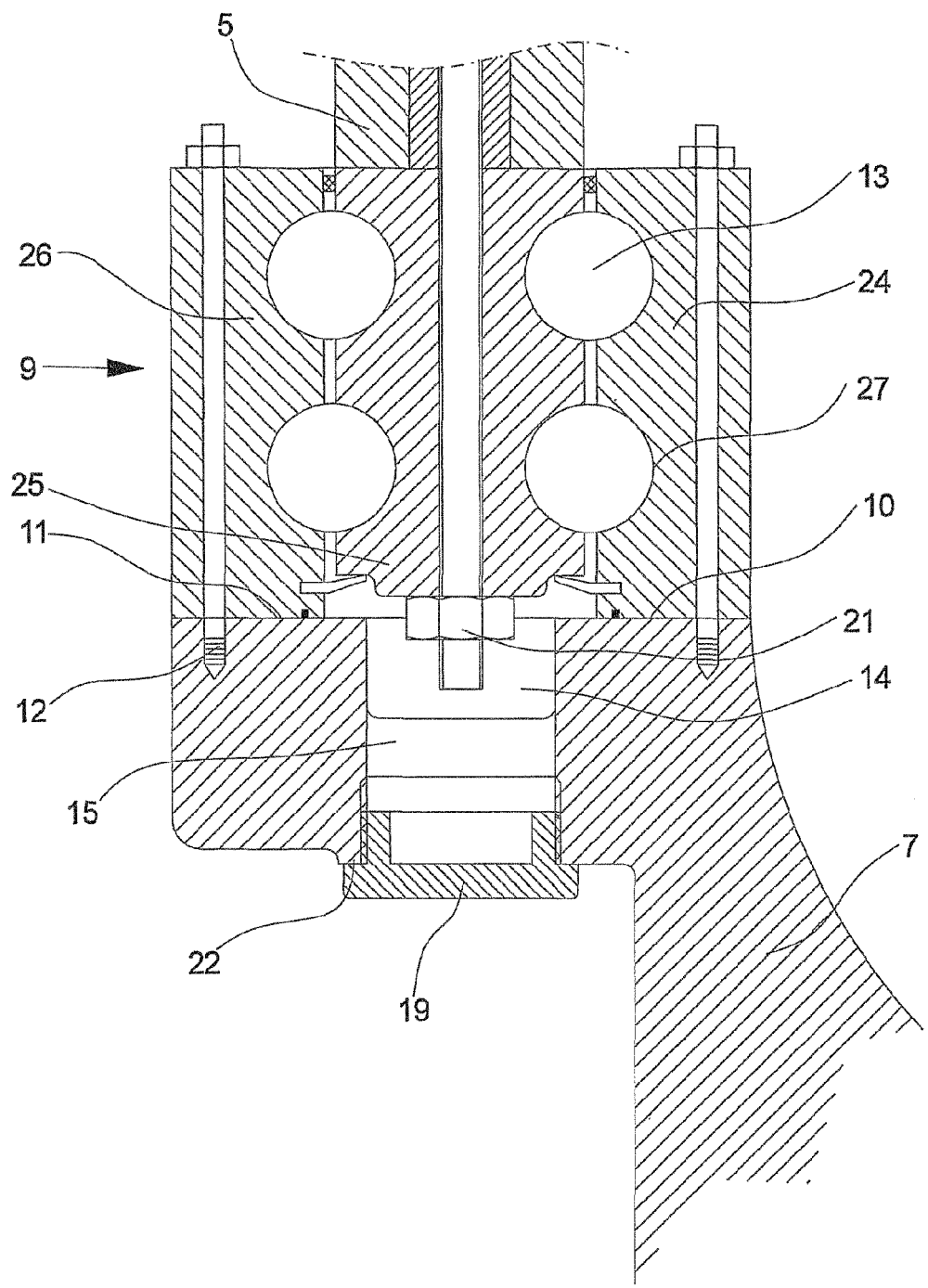
FIG. 5 illustrates a section through an examination hole of a mount area comprising a plug.

FIG. 5 illustrates a section through an examination hole 15 of a mount area 6. In this embodiment of the invention, the inner ring 26 of the pitch bearing 9 is connected to the inner load transferring surface 11 by means of stud bolts 21 and likewise, the outer ring 24 is attached to the outer load transferring surface 10.

The stud bolts 21, attaching the blade 5 to the centre ring 25 of the pitch bearing 9, extend into the groove, but in another embodiment of the invention, the centre ring 25 could be displaced upwards making room underneath it for the extending stud bolts 21, or the blade 5 could be attached by means of, e.g., Allen screws countersunk into the centre ring 25 of the pitch bearing 9. In this case, the mount area 6 could be made without the groove 14, leaving the two load transferring surfaces 10, 11 connected by a plain surface.

To prevent dirt or other harmful material from entering the pitch bearing 9 and, for example, to lubricate the bearing 9, the groove could be filled or partially filled with a lubricant such as bearing grease. The examining holes 15 would then have to be plugged by means of a plain plug forced into the examining holes 15 or as illustrated by providing the examining holes 15 with internal thread and then plug the holes 15 by means of a threaded plug 19.

Figure 6:
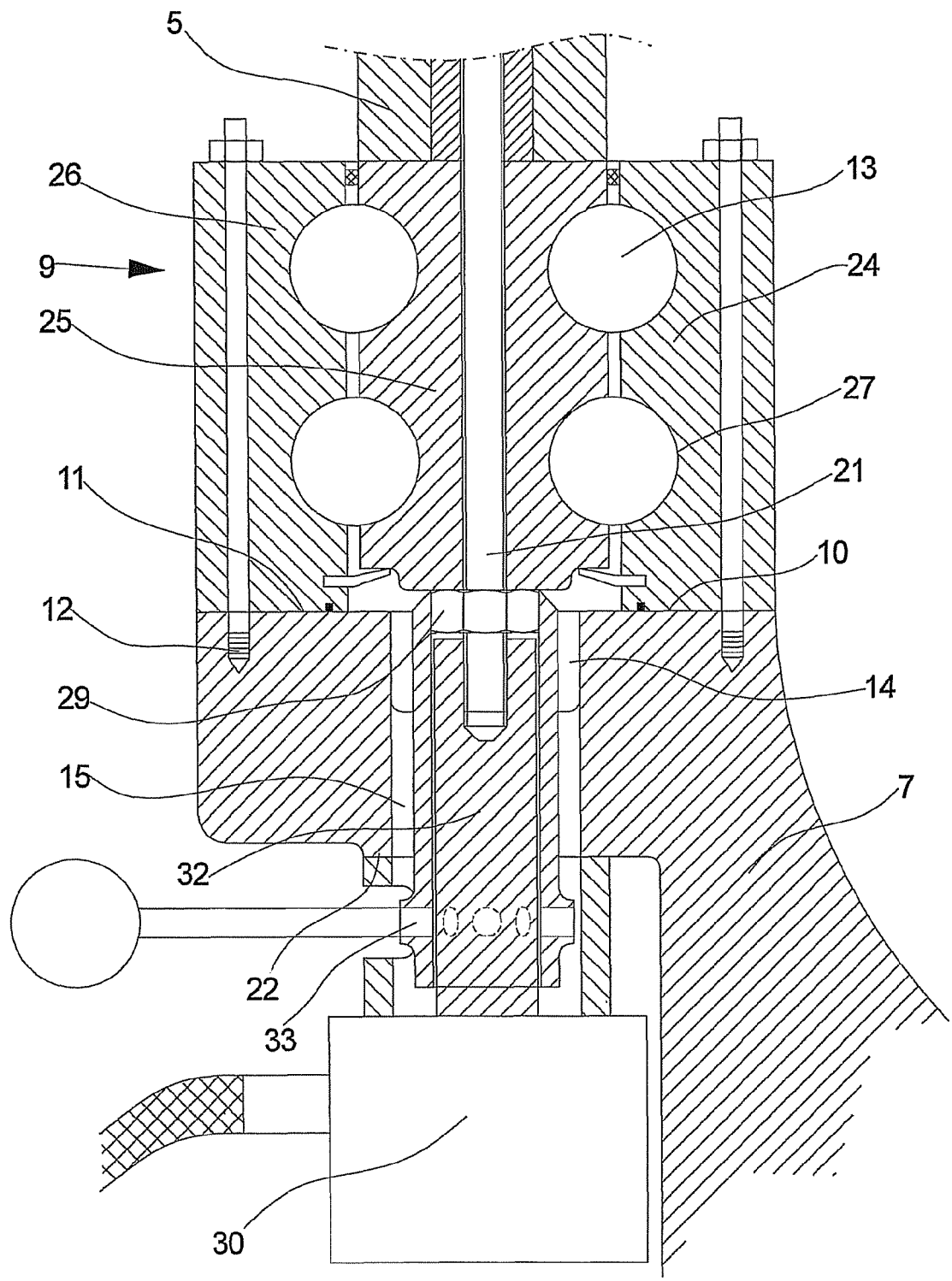
FIG. 6 illustrates a section through an examination hole of a mount area during tightening of a blade stud bolt.

FIG. 6 also illustrates a section through an examination hole 15 of a mount area. Besides from being used for examining the blade connection means 21 the examining holes 15 can also be used for tightening of the stud bolts 21. This can, for example, be done by means of a tightening equipment 30 as illustrated. The tightening equipment 30 comprises a centre pin 32 which is screwed onto the extending threaded part of the stud bolt 21 and pulled while the tightening equipment 30 is supported on a contact surface 22 on the hub 7. Hereby, the stud bolt 21 is provided with an exact amount of tension. A socket part 33 can then be used to tighten the nut 29, where after the stud bolt 21 is released.

Figure 7:
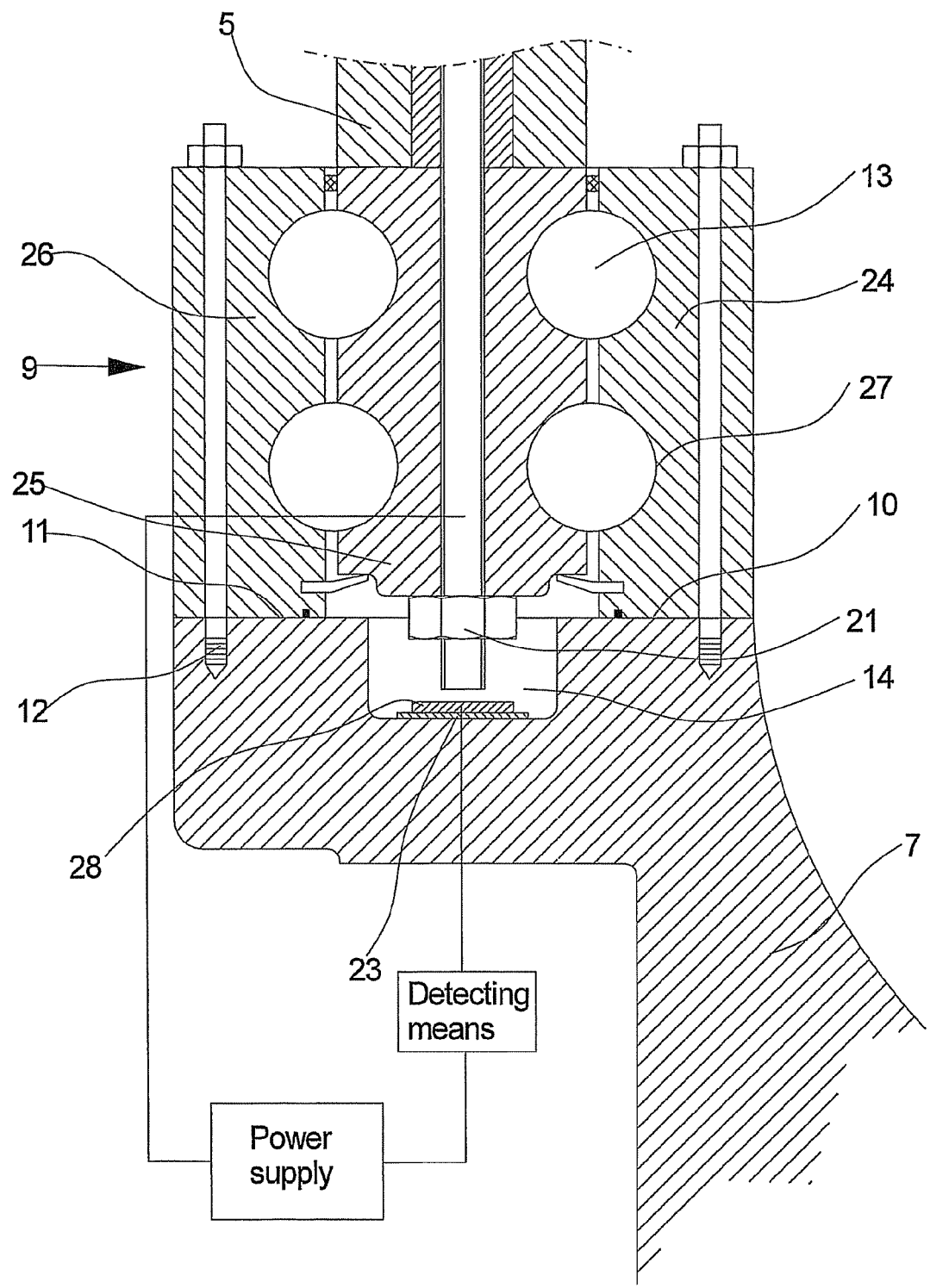
FIG. 7 illustrates a section through a mount area comprising a fault detection system.

FIG. 7 illustrates a section through a mount area 6. In this embodiment of the invention, the groove 14 is provided with a fault detection system. A detection ring 28 is placed at the bottom of the groove 14 and electrically isolated from the blade stud bolts 21 by incorporating it in or placing it on some sort of electrically isolating material 23. In another embodiment of the invention, the fault detection system could comprise more than one detection ring 28 or the one or more rings 28 could be subdivided into a number of ring part, e.g., to not cover the examining holes 15. An electrical potential difference between the blade stud bolts 21 and the ring 28 would then be established by connecting the blade stud bolts 21 and the ring 28 to a power supply, via some sort of detecting means for detecting an electrical current in the system. If a stud bolt 21 should brake or a nut 29 should unscrew itself, the bolt 21 or the nut 29 would make contact with the detection ring 28 and hereby establishing a closed electrical circuit, making the detecting mean detect a current in the circuit and start an alarm procedure.

Figure 8:
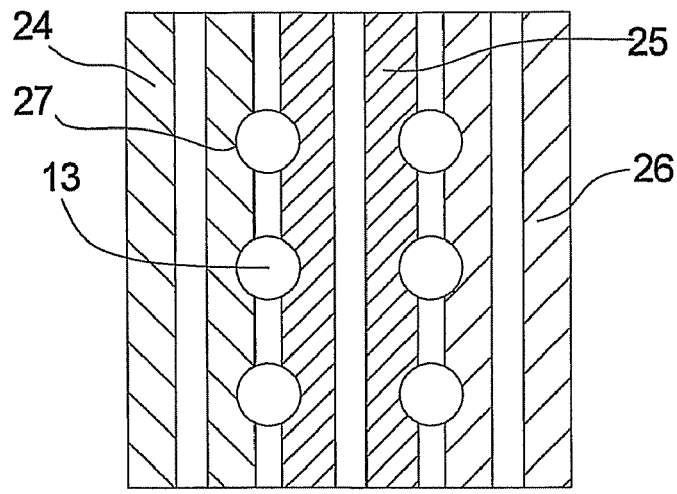
FIG. 8 illustrates an embodiment of a pitch bearing comprising three rings and six rows of balls.
Figure 9:
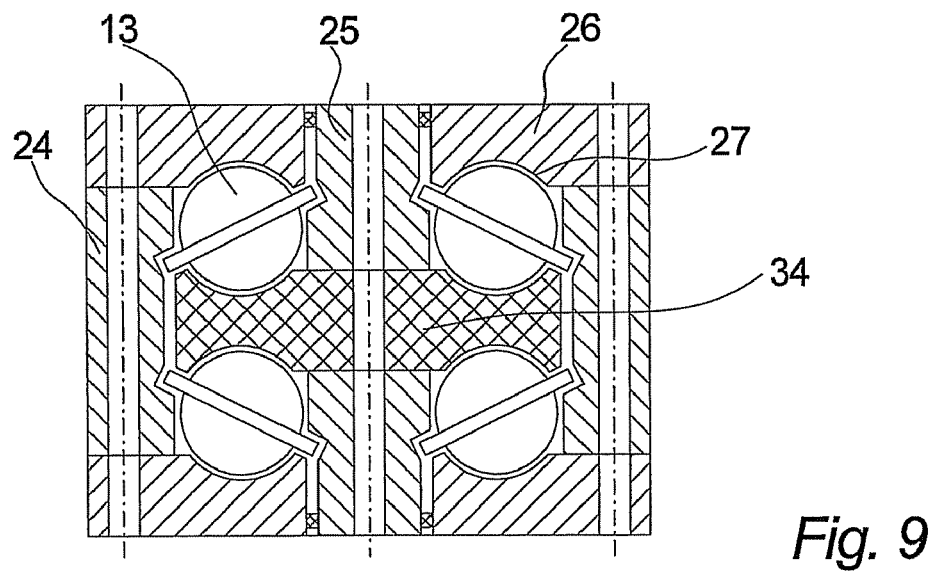
FIG. 9 illustrates an embodiment of a pitch bearing comprising three rings and four rows of balls.
Figure 10:
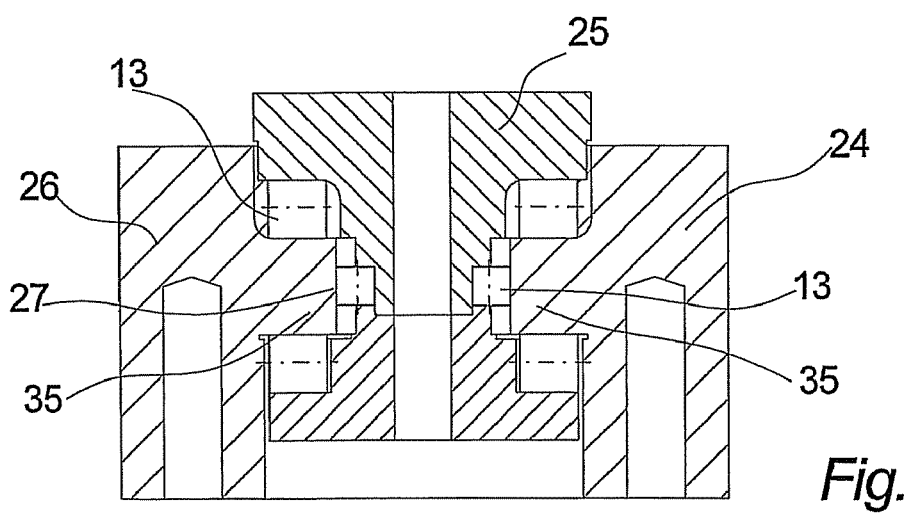
FIG. 10 illustrates an embodiment of a pitch bearing comprising three rings and six rows of rollers.

FIG. 8, 9 and 10 illustrates parts of cross sections of three different embodiments of pitch bearings 9 comprising three rings 24, 25, 26, which all could be used for connecting blades 5 to a hub 7 according to the invention.

FIG. 8 illustrates a part of a cross section of a pitch bearing 9 comprising three rows 27 of balls 13 between the outer ring 24 and the centre ring 25 and three rows 27 of balls 13 between the centre ring 25 and the inner ring 26. In another embodiment, the bearing 9 could comprise only one or two balls 13 between the rings 24, 25, 26.

FIG. 9 illustrates an embodiment of a pitch bearing 9 comprising two rows 27 of balls 13 between the outer ring 24 and the centre ring 25 and two rows 27 of balls 13 between the centre ring 25 and the inner ring 26. In this embodiment of the centre ring 25 is provided with a middle section 34 providing the bearing 9 with the ability to transfer very big axial loads.

FIG. 10 illustrates an embodiment of a pitch bearing 9 comprising three rows 27 of rollers 13 between the outer ring 24 and the centre ring 25 and three rows 27 of rollers 13 between the centre ring 25 and the inner ring 26. In this embodiment, the outer and the inner ring 24, 25 are provided with a middle section 35 making the bearing able to transfer very high axial loads.

The invention has been exemplified above with reference to specific examples of designs and embodiments of wind turbine hubs 7 and particularly the mount areas 6 and the load transferring surfaces 10, 11 on the hub 7. However, it should be understood that the invention is not limited to the particular examples described above but may be designed and altered in a multitude of varieties within the scope of the invention as specified in the claims.

The invention claimed is:

1. A wind turbine, comprising:
   at least two blade units each comprising a pitch controlled wind turbine blade and at least one pitch bearing including at least one outer ring, at least one centre ring and at least one inner ring; and
   a hub comprising a mount area for each of said blade units, wherein said mount area comprises at least two concentric load transferring surfaces for attaching said blade unit via said at least one pitch bearing.

2. The wind turbine according to claim 1, wherein said at least one outer ring of said at least one pitch bearing is attached to one of said at least two load transferring surfaces, and said at least one inner ring of said at least one pitch bearing is attached to another of said at least two load transferring surfaces.

3. The wind turbine according to claim 1, wherein said at least one center ring is attached to said blade.

4. The wind turbine according to claim 3, wherein said at least one center ring is attached to said blade by a blade connector and wherein said mount area comprises fault detection systems establishing a closed electrical circuit at a mechanical defect of said blade connector.

5. The wind turbine according to claim 4, wherein said fault detection systems comprise at least one detection ring or detection ring parts which is electrically isolated from and have opposite electrical potential of said blade connector.

6. The wind turbine according to claim 5, wherein said blade connector extends into at least one groove and wherein said at least one detection ring or detection ring parts is positioned in said groove.

7. The wind turbine according to claim 1, wherein said at least two concentric load transferring surfaces are separated by at least one groove.

8. The wind turbine according to claim 7, wherein said at least one center ring is attached to said blade by a blade connector and said blade connector extends into said at least one groove.

9. The wind turbine according to claim 8, wherein said at least two mount areas each are provided with examining through holes, said examining through holes being positioned in or in close proximity to said at least one groove.

10. The wind turbine according to claim 7, wherein said groove is filled or partially filled with a lubricant.

11. The wind turbine according to claim 1, wherein said at least two mount areas each are provided with examining through holes.

12. The wind turbine according to claim 11, wherein said at least two mount areas each are provided with four or more mutually evenly spaced examining through holes.

13. The wind turbine according to claim 11, wherein said examining through holes are plugged.

14. The wind turbine according to claim 11, wherein bottom sides opposite said load transferring surfaces and in close proximity of said examining through holes on said hub comprise one or more contact surfaces for tightening equipment.

15. The wind turbine according to claim 1, wherein said wind turbine is a variable speed pitch wind turbine.

16. A wind turbine hub for a wind turbine, comprising:
   at least two mount areas for mounting wind turbine blades via pitch bearings including at least one outer ring, at least one centre ring and at least one inner ring, wherein said mount areas each comprises at least two concentric load transferring surfaces for attachment of at least two of said rings.

17. The wind turbine hub according to claim 16, wherein said load transferring surfaces are provided with load transferring attachment means.

18. The wind turbine hub according to claim 16, wherein said at least two concentric load transferring surfaces are separated by at least one groove.

19. The wind turbine hub according to claim 18, wherein said at least one groove has a radial width of between 5 and 250 mm.

20. The wind turbine hub according to claim 18, wherein said at least one groove has a depth in relation to said load transferring surfaces of between 5 and 250 mm.

21. The wind turbine hub according to claim 18, wherein said at least two mount areas are provided with examining through holes.

22. The wind turbine hub according to claim 21, wherein said at least two mount areas each are provided with four or more mutually evenly spaced examining through holes.

23. The wind turbine hub according to claim 21, wherein said examining through holes are positioned in or in close proximity to said at least one groove.

24. The wind turbine hub according to claim 21, wherein said examining through holes have a diameter of between 5 and 250 mm.

25. The wind turbine hub according to claim 21, wherein bottom sides opposite said load transferring surfaces and in close proximity of said examining through holes on said hub comprise one or more contact surfaces for tightening equipment.

26. The wind turbine hub according to claim 25, wherein said one or more contact surfaces are parallel with said concentric load transferring surfaces.

* * * * *

UNITED STATES PATENT AND TRADEMARK OFFICE
CERTIFICATE OF CORRECTION

| | |
|---|---|
| PATENT NO. | : 8,147,202 B2 |
| APPLICATION NO. | : 11/995051 |
| DATED | : April 3, 2012 |
| INVENTOR(S) | : Anton Bech |

It is certified that error appears in the above-identified patent and that said Letters Patent is hereby corrected as shown below:

Title page

Item [57], Abstract, line 9, after "relates" insert --to--.

Column 1

Line 27, change "increase" to --increases--.

Line 29, change "increase" to --increases.--.

Line 38, change "ring" to --rings--.

Line 56, change "attachments" to --attachment--.

Column 3

Line 12, change "prevents" to --prevent--.

Line 40, change "have" to --has--.

Column 4

Line 15, change "provides" to --provide--.

Line 24, change "provides" to --provide--.

Line 46, change "provides" to --provide--.

Line 65, change "are" to --is--.

Column 5

Line 7, change FIG. 1," to --FIG. 1".--

Line 28, delete one occurrence of "DETAILED".

Line 44, change "comprise" to --comprises--.

Signed and Sealed this
Thirty-first Day of July, 2012

David J. Kappos
*Director of the United States Patent and Trademark Office*

Column 6

Line 6, change "comprise" to --comprises--.

Line 9, change "comprise" to --comprises--.

Column 7

Line 29, change "part" to --parts--.

Line 35, change "brake" to --break--.

Line 37, change "establishing" to --establish--.

Line 40, change "illustrates" to --illustrate--.

Line 53, delete "of".

Column 8

Claim 5, line 37, change "have" to --has--.